(No Model.)
J. F. McELROY.
DYNAMO ELECTRIC MACHINE.
No. 525,353. Patented Sept. 4, 1894.
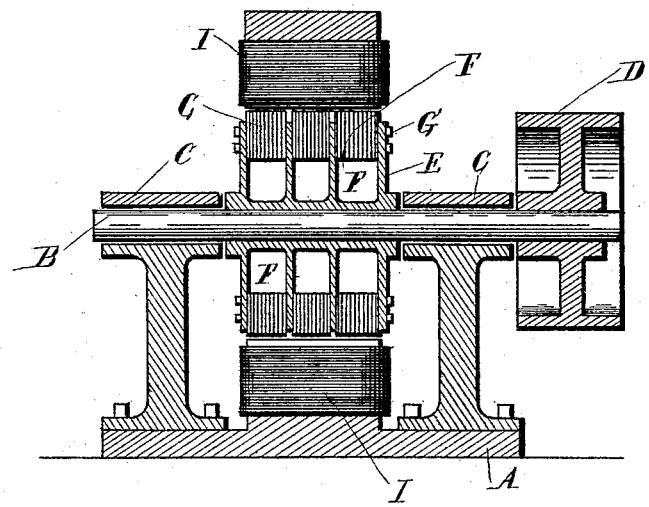
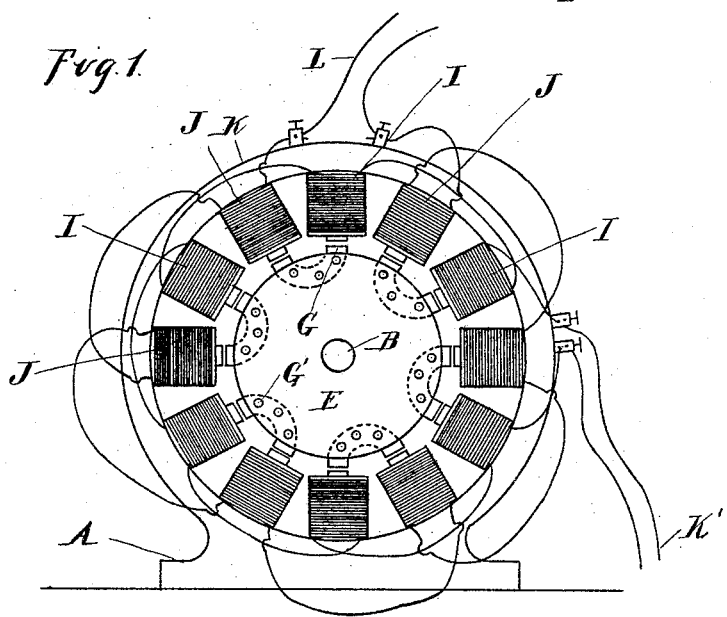
Witnesses
A. L. Stobbie
P. M. Hulbert
Inventor.
James F. McElroy
By Thos. Sprague & Son
Attys.

UNITED STATES PATENT OFFICE.

JAMES F. McELROY, OF ALBANY, NEW YORK, ASSIGNOR TO THE CONSOLIDATED CAR HEATING COMPANY, OF WHEELING, WEST VIRGINIA.

DYNAMO-ELECTRIC MACHINE.

SPECIFICATION forming part of Letters Patent No. 525,353, dated September 4, 1894.

Application filed January 10, 1891. Serial No. 377,383. (No model.)

*To all whom it may concern:*

Be it known that I, JAMES F. MCELROY, a citizen of the United States, residing at Albany, in the county of Albany and State of New York, have invented certain new and useful Improvements in Dynamo-Electric Machines, of which the following is a specification, reference being had therein to the accompanying drawings.

This invention relates to new and useful improvements in dynamo electric machines, of that class in which electric currents are generated without the use of a commutator or brushes. To attain this end by means of a circular range of fixed electro-magnets divided into two groups or systems, one having its coils connected into the magnetizing or exciter circuit, and the other into the induced circuit, in which the useful currents are generated by means of revolving soft iron armatures, which close at rapid intervals the magnetic circuit between the two systems of electro-magnets, all as more fully hereinafter described and shown.

In the drawings, Figure 1 is a diagram end elevation. Fig. 2 is a vertical central longitudinal section.

My invention is herein shown as embodied in a machine adapted to produce alternating currents.

A represents the base of the machine; B its revolving shaft, journaled in suitable bearings, C, that are supported upon the base, and also provided with an ordinary driving pulley D.

Securely fastened upon the shaft is a cylindrical body E, which is provided with annular recesses F, into which are secured the soft iron armatures G, each of which has two radially outward projecting polar extensions. These armatures are preferably formed of V or U shaped laminations, secured together and to the body by bolts G', and they are magnetically insulated from each other, preferably, by making the body of composition metal.

I and J represent an annular range of fixed electro-magnets, secured to a suitable frame K, and provided with polar projections extending in juxtaposition to the polar extensions of the soft iron armatures. The electro-magnets I form a magnetic field by having their coils connected into the exciter circuit K', and the electro-magnets J form the armature coils by having their coils connected into the induced circuit L, in which the useful currents are generated. As shown in the drawings, the electro-magnets I and J alternate with each other, and are connected in series respectively with the coils in each series alternately wound in opposite directions.

In practice, the parts being constructed and arranged as shown and described, the machine operates as follows: By examining Fig. 1, it will be seen that if the shaft which carries the soft iron armature is revolved, there will be certain places in which the radially projecting polar extensions of the soft iron armatures will be in exact juxtaposition with the inwardly projecting polar extensions of the electro-magnets, and if the electro magnets which constitute the field magnet are charged by the exciter circuit, a maximum number of lines of force will at that moment enter the soft iron armatures at one of the polar projections, and pass out through the other polar projections into the electro-magnets which form the stationary armature. As the soft iron armatures are drawing away from such position, the number of lines of force entering them will be diminished, and a minimum will be reached when their polar extensions are exactly midway between the polar extensions of the magnets. After passing this minimum another maximum will be reached as soon as the polar extensions move again into juxtaposition with the electro-magnets. Thus there are at each revolution as many maximum and minimum phases of magnetic induction from one set of electro-magnets into the other as there are electro-magnets, and it is obvious that if the shaft is rapidly revolved the change of magnetic induction will create an electro-motive force which will produce induced currents in the circuit L, the potential of which is equal to the sum of the potentials in the coils.

By winding the field coils alternately in opposite directions, as shown in the drawings, an alternating current may be generated. If desired to obtain a lower potential, or if deemed more convenient otherwise, the coils of the field magnets may be connected in parallel or multiple series, but I do not deem it necessary to describe or show any of these variations, as they are well understood in the art. It is also to be understood that the soft iron armatures and their polar extensions may be variously formed, and other mere formal changes in the style or form of the machine may be made without departing from the spirit of my invention.

What I claim as my invention is—

1. In a dynamo electric machine, the combination of an annular frame, a series of electro-magnets secured within said frame and provided with radially inward extending cores placed at equal distances apart, a magnetizing circuit connecting the coils of the alternate magnets and forming alternate positive and negative field magnets, a generating circuit connecting the coils of the intermediate magnets and a series of magnetically insulate armatures mounted upon a revolving shaft, and each provided with two radially extending poles corresponding in size with the poles of the electro-magnets and adapted to magnetically connect the poles of two adjacent magnets simultaneously in all the armatures, substantially as described.

2. In a dynamo electric machine, the combination of the annular frame K, the alternating circular series of electro-magnets I J, secured within said frame and provided with radially inward extending cores having their coils alternately connected into a magnetizing circuit to form alternate positive and negative field magnets and into a generating circuit comprising the coils of the magnets intermediate between said field magnets, the cylindrical non-magnetic body E mounted upon a revolving shaft and provided with annular recesses F and the U shaped armatures secured in said recesses and having radial polar extensions corresponding with the cores of the electro magnets, said armatures being adapted to magnetically connect the polar extensions corresponding with the cores of the electro-magnets, said armatures being adapted to magnetically connect the poles of two adjacent magnets simultaneously in all the armatures, substantially as described.

In testimony whereof I affix my signature in presence of two witnesses.

JAMES F. McELROY.

Witnesses:
EDWIN A. SMITH,
H. J. NODINE.